UNITED STATES PATENT OFFICE 2,428,491

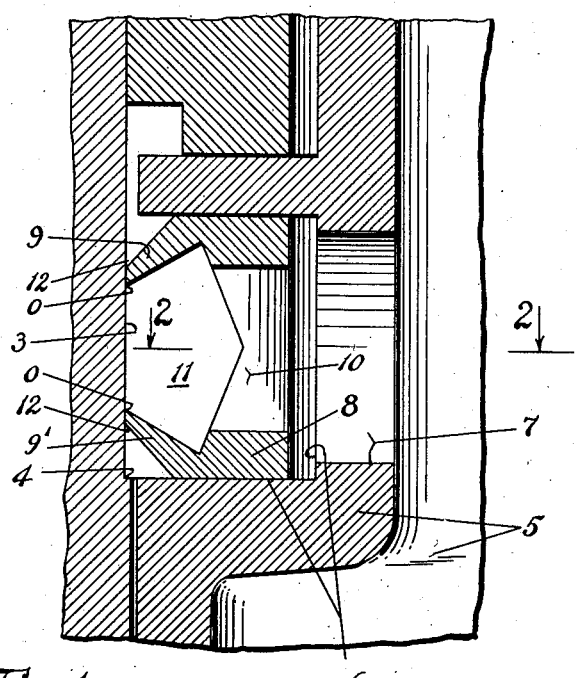
Fig. 1
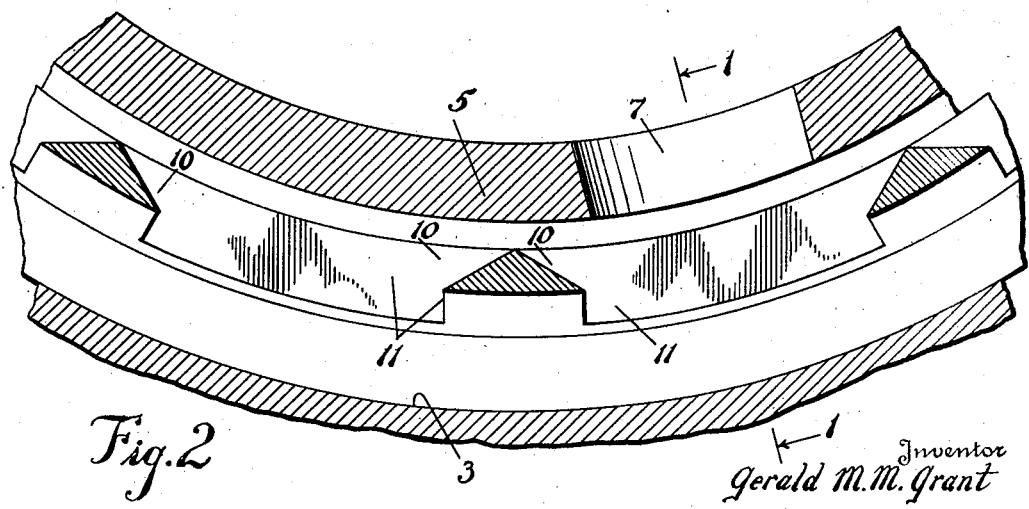
Fig. 2
Inventor
Gerald M. M. Grant

PISTON OIL RING

Gerald M. M. Grant, Los Angeles, Calif.

Application July 16, 1945, Serial No. 605,240

4 Claims. (Cl. 309—45)

This invention relates to piston oil rings, and more particularly to a piston oil ring designed to be used in the lower piston groove for the purpose of collecting any surplus oil there may be on the cylinder wall during the operation of the motor and for directing it back into the crank case.

Among the salient objects of the invention are: to provide a piston oil ring which can be inserted in the groove with either side up, there being no difference in the two sides of the ring, thus greatly simplifying the installation of the ring in place; to provide a piston oil ring having two wall engaging portions tapering toward each other and thus providing an oil receiving chamber therebetween, with drain outlets through the body of the ring to communicate with the drain openings in the piston wall inwardly from the piston oil ring groove; to provide a piston oil ring in which the cylinder wall-engaging portions of said ring, on their opposite outer surfaces are at acute angles relative to the cylinder wall, whereby, as said oil ring moves in one direction, the advancing ring portion moves over any oil on the cylinder wall and causes said oil to spray or move inwardly toward the oil receiving chamber in said ring, while the following ring portion, being at an obtuse angle relative to the cylinder wall tends to scoop up said oil, thus facilitating the gathering of any surplus oil on the cylinder wall into said ring chamber. This action is the same when the piston and said oil ring moves in the opposite direction.

In order to fully explain my invention, I have illustrated the same on the accompanying sheet of drawings in which:

Figure 1 is an enlarged, fragmentary, sectional view of a part of a piston, taken on the line 1—1, of Fig. 2, showing a part of a cylinder wall, a part of a piston with piston ring grooves, and with my new oil ring in place therein;

Figure 2 is a fragmentary cross sectional view taken on the line 2—2 of Fig. 1.

Referring in detail to the drawings, my invention as here illustrated for explanatory purposes, may be described as follows:

A fragmentary part of a cylinder wall is designated 3, showing an annular shoulder at 4, caused by the wear on the cylinder wall by the piston rings in so many cases.

The portion of the piston shown is designated 5, with the oil piston ring groove 6, with the drain openings 7 through the piston wall into the cylinder and to the crank case. This construction is old and well known in the art.

My new oil ring body is designated 8, and is shown provided with two tapering, cylinder wall-engaging portions 9, 9', and with drain openings 10, through the body, as seen in both views.

Said wall-engaging portions 9, 9', engage the cylinder wall 3 at an obtuse angle relative to each other, as at 0, 0, and form therebetween an oil receiving chamber 11, larger on its interior than at its mouth, and which communicates with the drain openings 10, 10, interiorly. The outer surfaces of said wall-engaging portions 9, 9', are also tapering, and with relation to the cylinder wall 3, said opposite, outer surfaces form acute angles, as at 12, 12.

It will be noted that the top and bottom of said ring are the same and that it makes no difference which way the ring is placed in the piston ring groove.

Another advantage of this form of oil ring is, that the outer or beveled form of the wall engaging portions 9, 9', prevents the ring from engaging the shoulder 4, caused by wear, as before referred to, and thus prevents any knocking in the motor which frequently happens when an oil ring in the lower oil groove constantly strikes this shoulder, as it does when resting flatwise upon the floor of the oil ring groove 6.

In operation, as the piston moves up, the upper tapering wall-engaging portion 9, being inclined as it is, moves easily over any oil on the cylinder wall at the relatively narrow wall-engaging point, at 12, which causes any oil on the wall to spray or move inwardly toward the oil chamber 11, as said portion 9 moves over it, and the following wall-engaging portion 9' readily scoops up such oil and operates to move it inwardly into said oil receiving chamber 11, and toward the drain openings 10, 10. On the down stroke, the operation is the same, for the lower wall-engaging portion 9' moves over oil on the cylinder wall, causing it to spray or move inwardly toward the chamber 11, to be scooped up by the following wall-engaging portion 9 on the downward movement.

This new form of oil ring has demonstrated its efficiency in gathering any and all surplus oil from the cylinder wall and at the same time leaving sufficient oil on the wall for lubrication purposes and to prevent wear of the cylinder wall, as is the case where steel rings are used and where the cylinder wall is frequently dry and without any lubrication.

I do not limit my invention to the details of construction and showing here made for explanatory purposes, except as I may be limited by the hereto appended claims.

I claim:

1. A piston oil ring having a body to fit a piston oil ring groove provided with drainage openings, said oil ring body having an oil-receiving chamber formed therein, opening outwardly and of greater vertical area than the mouth of said chamber, and having straight centrally disposed drain openings therefrom inwardly to the drain openings from said piston groove, the wall-engaging portions of said oil ring being beveled top and bottom, whereby to form two converging wall-engaging portions of said oil ring, to function in both directions in scooping oil from the cylinder wall.

2. A piston oil ring having a body fitted to a piston ring groove provided with drainage openings and having its outer top and bottom wall-engaging portions beveled, and having an oil-receiving chamber formed therein between said portions, whereby to form two tapering wall-engaging ring portions converging toward each other, said oil ring being identical top and bottom and reversible in the piston ring groove, the body of said ring having a drain opening inwardly from said oil-receiving chamber to the drain opening in the piston ring groove, said wall-engaging portions functioning in both directions to scoop oil from the cylinder wall.

3. The combination with a piston having a ring groove therein with drain openings therefrom, of an oil ring to fit said groove and having drain openings therethrough, said openings being approximately parallel with the top and bottom of said ring, and an oil-receiving chamber in said ring in front of said drain openings and of greater vertical area than the drain opening through said ring, the outer upper and lower portions of said ring being formed into tapering converging wall-engaging portions forming the opening into said oil-receiving chamber, the outer opposite surfaces of said tapering converging wall-engaging portions being tapering and at acute angles, above and below, with the cylinder wall, whereby said outer opposite surfaces move over oil on the cylinder wall, and the inner surfaces of said tapering portions, forming obtuse angles with the cylinder wall, alternately scoop oil surge caused by the tapering portions moving over oil on said wall.

4. The combination with a piston having a ring groove therein with drain openings therefrom, of a reversible oil ring to fit said groove and having straight drain openings centrally disposed therethrough, cut from the inside out, and an oil-receiving chamber in said ring in front of said drain openings and of greater vertical area than the drain openings through said ring, the outer upper and lower portions of said ring both being formed into tapering converging wall-engaging portions having straight parallel wall-engaging faces and forming the opening into said oil-receiving chamber, the outer opposite surfaces of said tapering converging wall-engaging portions being tapering and at acute angles, above and below, with the cylinder wall, whereby said opposite surfaces move over oil on the cylinder wall, and the inner surfaces of said tapering portions, forming obtuse angles with the cylinder wall, alternately scoop up oil surge caused by the tapering portions moving over oil on said wall in both directions.

GERALD M. M. GRANT.

REFERENCES CITED

The following references are of record in the file of this patent:

UNITED STATES PATENTS

| Number | Name | Date |
| --- | --- | --- |
| 1,749,831 | Morton | Mar. 11, 1930 |
| 1,803,309 | Budlong | Apr. 28, 1931 |
| 1,868,744 | Grant | July 26, 1932 |
| 2,101,120 | Wilkening | Dec. 7, 1937 |
| 2,128,372 | Marien | Aug. 30, 1938 |
| 2,169,613 | Niederlehner | Aug. 15, 1939 |

FOREIGN PATENTS

| Number | Country | Date |
| --- | --- | --- |
| 439,353 | England | Dec. 5, 1935 |